United States Patent
Gratton et al.

(10) Patent No.: US 7,269,951 B2
(45) Date of Patent: Sep. 18, 2007

(54) THROAT RETENTION APPARATUS FOR HOT GAS APPLICATIONS

(75) Inventors: Jason A. Gratton, Chandler, AZ (US); Donald J. Christensen, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 199 days.

(21) Appl. No.: 10/952,109

(22) Filed: Sep. 27, 2004

(65) Prior Publication Data

US 2006/0064984 A1    Mar. 30, 2006

(51) Int. Cl.
F02K 1/00    (2006.01)

(52) U.S. Cl. .................. 60/770; 239/265.15

(58) Field of Classification Search ............ 60/200.1, 60/229, 770; 239/265.15, 265.19, 265.27
See application file for complete search history.

(56) References Cited

U.S. PATENT DOCUMENTS

| | | | |
|---|---|---|---|
| 2,849,860 A | 9/1958 | Lowe | |
| 3,103,784 A * | 9/1963 | Vetter et al. | 60/253 |
| 3,133,411 A * | 5/1964 | McCorkle | 239/265.15 |
| 3,140,584 A * | 7/1964 | Ritchey et al. | 60/232 |
| 3,167,909 A | 2/1965 | Thielman | |
| 3,200,585 A | 8/1965 | Climent et al. | |
| 3,212,257 A | 10/1965 | Frey et al. | |
| 3,228,186 A | 1/1966 | Allen | |
| 3,230,708 A * | 1/1966 | Huang et al. | 60/232 |
| 3,282,421 A * | 11/1966 | Prosser et al. | 239/127.3 |
| 3,313,488 A * | 4/1967 | Lovingham | 239/127.1 |
| 3,362,646 A * | 1/1968 | Connolly | 239/265.35 |
| 3,372,548 A * | 3/1968 | Mathis et al. | 60/771 |
| 3,419,441 A * | 12/1968 | McAllister et al. | 148/276 |
| 3,545,679 A * | 12/1970 | McAllister et al. | 239/265.15 |
| 3,606,164 A * | 9/1971 | Stokes, Jr. et al. | 239/265.15 |
| 3,648,461 A | 3/1972 | Bailey et al. | |
| 3,659,423 A * | 5/1972 | Lair et al. | 60/232 |
| 3,688,988 A * | 9/1972 | Howison et al. | 239/265.15 |
| 3,729,935 A * | 5/1973 | Fletcher et al. | 60/256 |
| 3,914,935 A * | 10/1975 | Burkes, Jr. | 60/225 |
| 3,980,105 A * | 9/1976 | Myskowski | 138/140 |
| 4,232,843 A * | 11/1980 | Clark et al. | 244/3.29 |
| 4,548,033 A * | 10/1985 | Cann | 60/203.1 |
| 4,722,185 A * | 2/1988 | Campbell | 60/247 |
| 4,726,184 A * | 2/1988 | Russell | 60/247 |
| 4,825,647 A | 5/1989 | Cann | |
| 4,852,347 A | 8/1989 | Reynolds et al. | |
| 6,209,312 B1 * | 4/2001 | Singer et al. | 60/770 |
| 6,510,694 B2 * | 1/2003 | Bruno et al. | 60/770 |
| 6,711,901 B1 | 3/2004 | Canfield et al. | |
| 2003/0126855 A1 * | 7/2003 | Bruno et al. | 60/253 |

* cited by examiner

Primary Examiner—William H. Rodriguez
(74) Attorney, Agent, or Firm—Ingrassia Fisher & Lorenz

(57) ABSTRACT

A nozzle for use in a hot gas valve is provided that includes a housing, an insert, and a throat retainer. The housing is constructed of an insulating material and has a flow path formed therein. The flow path has a throat section. The insert is made of material capable of maintaining structural integrity at a temperature up to about 5000° F. and is disposed at least partially in the throat section and has a flow path extending therethrough in fluid communication with the housing flow path. The throat retainer is constructed of material having insulating and ablative properties and is coupled between the housing and the insert and configured to retain the insert within the housing throat section.

12 Claims, 3 Drawing Sheets

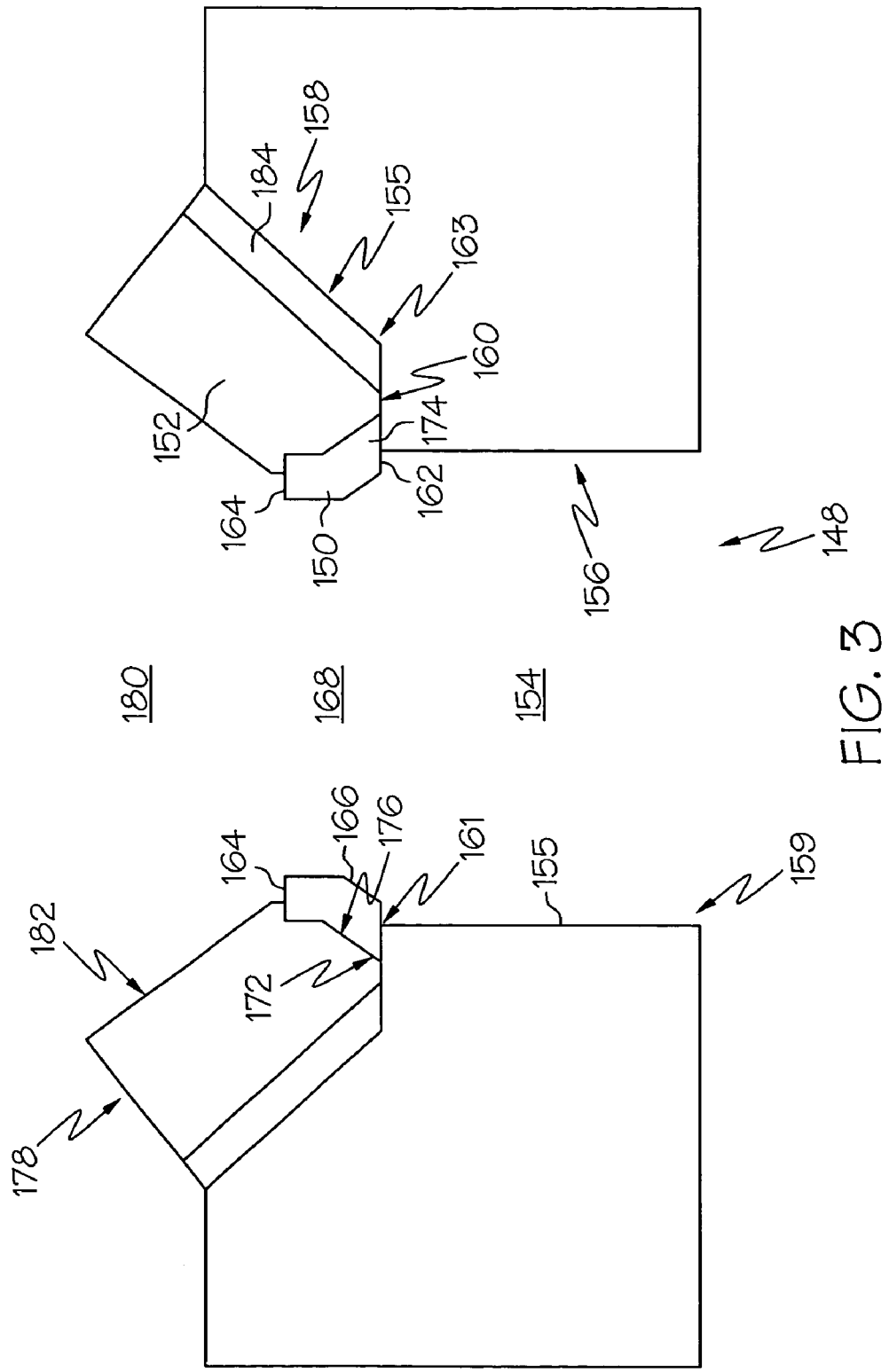

THROAT RETENTION APPARATUS FOR HOT GAS APPLICATIONS

STATEMENT REGARDING FEDERALLY SPONSORED RESEARCH OR DEVELOPMENT

This invention was made with Government support under contract number F0863099C0027 awarded by the Air Force Research Laboratories. The Government has certain rights in this invention.

TECHNICAL FIELD

The present invention relates to rockets and missiles and, more particularly, to valve nozzles for use with rockets and missiles.

BACKGROUND

Many rockets and missiles include one or more solid rocket motors to generate thrust to achieve and/or maintain flight, and/or to control in-flight direction. A solid rocket motor may include, for example, a motor case and a main nozzle. Typically, the motor case defines a combustion chamber, in which propellant is loaded and combusted to generate high-energy combustion gas. The main nozzle is typically in fluid communication with the combustion chamber and thus receives the high-energy combustion gas. The main nozzle may include a convergent inlet section, a divergent outlet section, and an interposing main nozzle throat. Combustion gas generated in the combustion chamber flows through the main nozzle, generating a thrust.

Solid rocket motors, such as the one briefly described above, are used in both strategic and tactical rockets and missiles. In general, strategic missiles are used for long duration missions, whereas tactical missiles are used for relatively short duration flight missions. Both types of missiles may be equipped with guidance capabilities, whereby valves are employed to divert high-energy combustion gases from the main nozzle to one or more peripheral valve nozzles. The valve nozzles are designed to be used to steer the missile in a desired direction.

Each valve nozzle includes an inlet, outlet and a flow path extending therebetween. Typically, the flow path has a predetermined shape that is designed to provide optimal lateral control. Thus, the predetermined flow path shape is preferably maintained during valve nozzle operation. In this regard, some valve nozzles are formed from material capable of withstanding exposure to temperatures at least up to 5000° F. Although these materials are effective in maintaining the shape of the nozzle flow path, they may conduct heat and transfer the heat to surrounding components. Consequently, surrounding components that may be heat-sensitive, such as valves, may become damaged or may need to undergo more frequent maintenance. Other valve nozzles may be formed from high temperature material having insulating properties; such materials include phenolic. These high temperature materials insulate surrounding components from heat, however, many have ablative properties. Thus, the materials may not provide the desired structural integrity to prevent deformation of the valve nozzle upon exposure to extreme heat.

Therefore, there is a need for a valve nozzle that is capable of maintaining the shape of its preformed flow path; insulating surrounding components from extreme heat exposure; and minimizing erosion of the throat section of the valve nozzle flow path. The present invention addresses one or more of these needs.

BRIEF SUMMARY

The present invention provides a nozzle for use in a hot gas valve that includes a housing, an insert, and a throat retainer. The housing is constructed of an insulating material and has a flow path formed therein. The flow path has a throat section. The insert is made of material capable of maintaining structural integrity at a temperature up to about 5000° F. and is disposed at least partially within the throat section and has a flow path extending therethrough in fluid communication with the housing flow path. The throat retainer is constructed of material having insulating and ablative properties and is coupled between the housing and the insert and configured to retain the insert within the housing throat section.

In one embodiment, and by way of example only, an insert is provided that is configured to be retained between a phenolic valve housing and a phenolic throat retainer, wherein the valve housing has a flow path formed therein, and the flow path includes a cylindrical section coupled to a divergent section. The insert includes an inlet end, an outlet end coupled to the inlet end, an inner surface, and an outer surface. The inner surface defines a flow path between the inlet end and outlet end. The outer surface is defined between the inlet end and outlet end. The outer surface and inlet end define a flange therebetween, which is configured to be at least partially retained between the valve housing and throat retainer.

In another embodiment, and by way of example only, a method is provided for manufacturing a valve nozzle formed in a phenolic housing. The method includes the steps of press-fitting an insert into a throat of the valve nozzle, and bonding a phenolic throat retainer to the valve nozzle to thereby retain the insert between the phenolic housing and the phenolic throat retainer.

Other independent features and advantages of the preferred throat retention apparatus and methods will become apparent from the following detailed description, taken in conjunction with the accompanying drawings which illustrate, by way of example, the principles of the invention.

BRIEF DESCRIPTION OF THE DRAWINGS

FIG. 3 is a close-up view of an exemplary valve nozzle throat section depicted in FIG. 2.

DETAILED DESCRIPTION OF A PREFERRED EMBODIMENT

The following detailed description is merely exemplary in nature and is not intended to limit the invention or its application and uses. Furthermore, there is no intention to be bound by any theory presented in the preceding background or the following detailed description. In this regard, before proceeding with the detailed description, it will be appreciated that the present invention is not limited to use with a particular type or configuration of rocket motor, and it will be appreciated that the embodiments could also be used in conjunction with any component intended to be exposed to hot gases.

Figure 1:
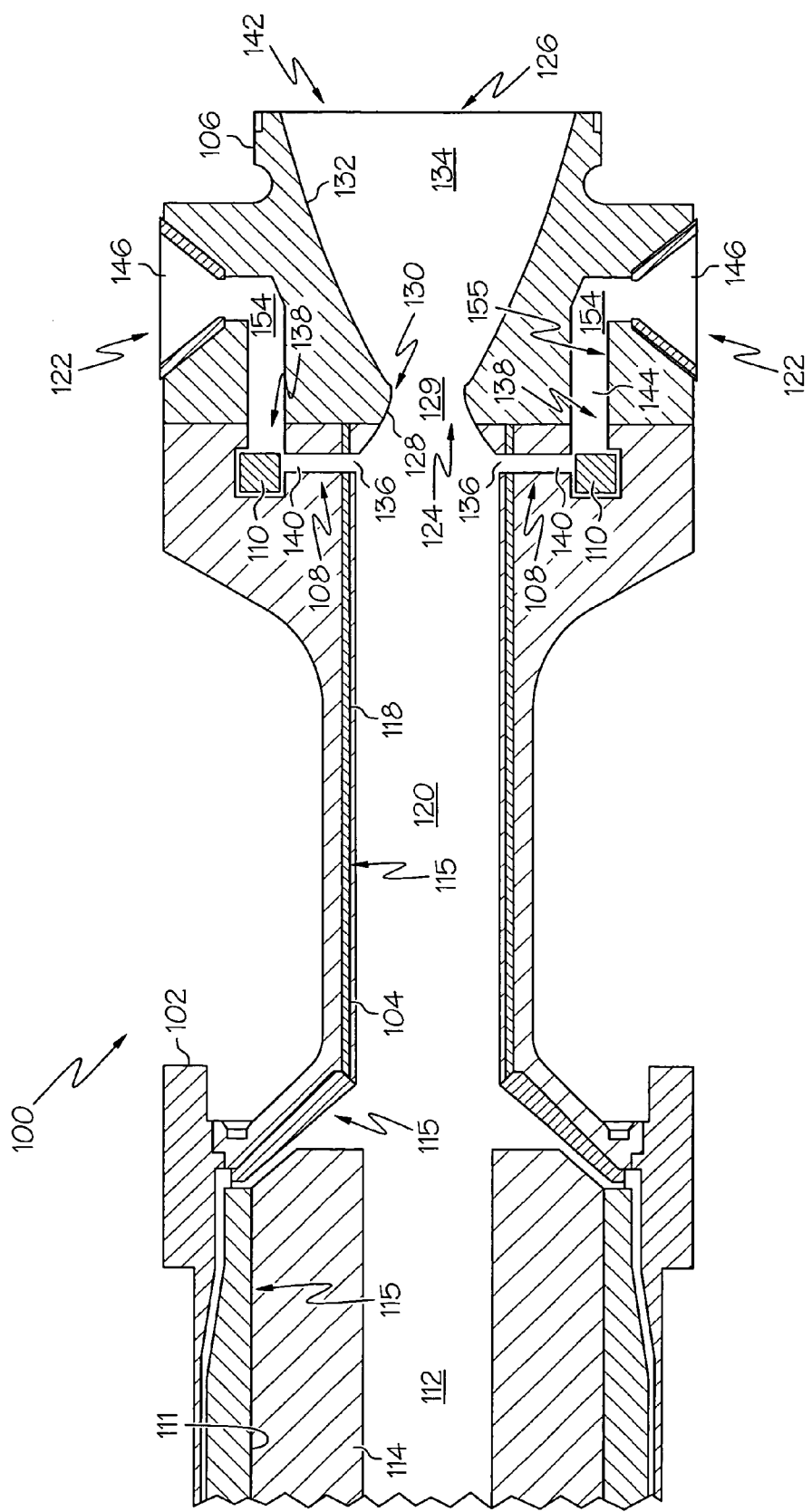
FIG. 1 is a simplified partial cross-sectional view of an exemplary embodiment of a rocket.

FIG. 1 provides a simplified cross section view of an exemplary embodiment of a solid rocket motor 100. The solid rocket motor 100 includes a motor case 102, a blast tube 104, and a nozzle housing 106. The motor case 102 has an inner surface 111 that defines a combustion chamber 112 within which rocket propellant 114 is housed. The motor case inner surface 111 may include an insulation layer or liner 115 to protect the case 102 from the potentially extreme conditions produced by combustion of the propellant 114.

The rocket propellant 114 is a solid rocket propellant, though it will be appreciated that various other types of propellant may be used. No matter the particular type of rocket propellant 114, it will be appreciated that a non-illustrated igniter, upon receipt of one or more command signals, ignites the rocket propellant 114. The ignited rocket propellant 114 produces combustion gas, which is directed into the blast tube 104.

The blast tube 104 is coupled to the motor case 102 and includes an inner surface 118 and a plurality of valve ducts 108. The inner surface 118 defines a flow passage 120 that is in fluid communication with the combustion chamber 112 and receives the combustion gas produced therein. The flow passage 120 directs a majority of the combustion gas into the nozzle housing 106. In one exemplary embodiment, the blast tube inner surface 118 includes an insulation layer 115 deposited thereon to protect the blast tube 104 from the combustion gas.

Each valve duct 108 diverts at least a portion of the combustion gas away from the blast tube flow passage 120. In the depicted embodiment, the rocket motor 100 includes two valve ducts 108 that divert gas in two different directions; however, it will be appreciated that this is merely exemplary and that various other numbers of valve ducts 108 may be included. Each valve duct 108 includes an inlet port 136, an outlet port 138, a valve channel 140, and a control valve 110. In the depicted embodiment, the valve duct inlet port 136 is in fluid communication with the blast tube flow passage 120, however, it will be appreciated that in alternative embodiments, the valve duct inlet ports 136 could be in fluid communication with a non-illustrated, external source of pressurized gas flow.

The control valves 110 regulate the flow of combustion gases through the valve ducts 108. The control valves 110 are disposed at least partially within one of the valve channels 140, and are movable between a closed position and an open position, to thereby allow and prevent gases from passing through, respectively. Any one of numerous types of valves may be implemented. In addition, although one control valve 110 is shown disposed in each valve duct 108, it will be appreciated that the rocket motor 100 may include more than one control valve per duct 108, or alternatively, could be configured such that a single control valve 110 controls the flow of combustion gases through a plurality of valve ducts 108.

The nozzle housing 106 is coupled to the blast tube 106 and is in direct contact with the high-temperature combustion gas. Thus, the nozzle housing 106 is preferably constructed of a material capable of operating at these high temperatures (up to about 5000° F.). Additionally, the material preferably is capable of providing insulation from the heat to adjacent components. The material preferably has ablative properties and may be, for example, phenolic, EPDM, or similar rubber compounds.

The nozzle housing 106 includes a main nozzle 142 and a plurality of valve nozzles 122. The main nozzle 142 includes an inlet section 124 and an outlet section 126, interposed by a main nozzle throat 130, that together define a convergent/divergent flow passage. The main nozzle inlet section 124 fluidly communicates with the blast tube flow passage 120 and includes an inner surface 128 that defines an inlet flow passage 129. In the depicted embodiment, the inlet flow passage 129 has a convergent cross sectional flow area, however, it will be appreciated that the flow passage 129 may have any one of numerous other shapes, such as cylindrical or spiral. The main nozzle outlet section 126 includes an inner surface 132 that defines an outlet flow passage 134 having a divergent cross sectional flow area and which is fluidly coupled to the inlet flow passage 129 via the main nozzle throat 130.

The valve nozzles 122 are circumferentially spaced around the main nozzle 142. The valve nozzles 122 each fluidly communicates with a corresponding valve duct 108. Each valve nozzle 122 has an inlet 144, an outlet 146, and a flow path 154 defined by an inner surface 155 that extends therebetween. It will be appreciated that although two valve nozzles 122 are depicted in FIG. 1, any number of valve nozzles may be implemented, however, the use of more valve nozzles may increase directional control of the rocket 100. Although a portion of the flow path 154 is illustrated as having an L-shape, it will be appreciated that the flow path 154 may have any one of numerous shapes that may be suitable for directing gases through the valve nozzle 122 to provide lateral control of the rocket 100, such as spiral-shaped or convergent/divergent shapes.

Figure 2:
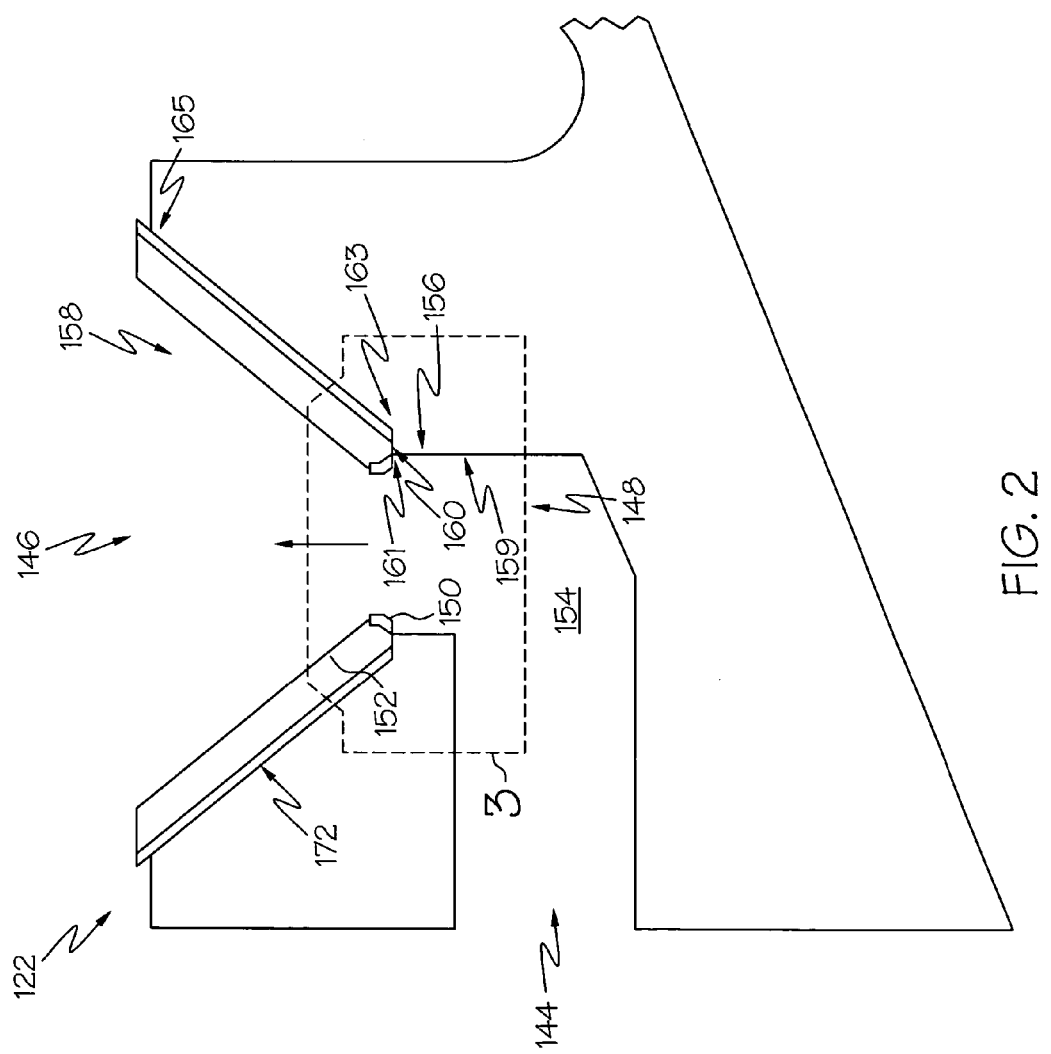
FIG. 2 is a close-up view of an exemplary nozzle housing that may be employed on the rocket depicted in FIG. 1.

Turning now to FIGS. 2 and 3, close up views are provided of a portion of one of the valve nozzle flow paths 154. As is shown more clearly in the figures, the flow path 154 has a throat section 148 that includes a cylindrical inlet section 156 and a divergent outlet section 158. The cylindrical inlet section 156 has an inlet 159, an outlet 161, and a cross sectional flow area. Similarly, the divergent outlet section 158 has an inlet 163 and an outlet 165, and each has a cross sectional flow area. The cross sectional flow area of the divergent section inlet 163 is greater than the cross sectional flow area of the cylindrical section 156; consequently, the two are coupled to one another by a ledge 160.

An insert 150 and a throat retainer 152 are disposed within the flow path 154. The insert 150 is disposed within and retains the shape of at least a portion of the throat section 148. In this regard, the insert 150 is constructed of material capable of retaining structural integrity at temperatures up to about 5000° F. Suitable materials, include, but are not limited to appropriate ceramics, refractory metals, including but not limited to tungsten, rhenium, molybdenum, niobium, tantalun, titanium, alloys including more than one refractory, ceramic or ceramic/metallic hybrid material, or any other material or alloys having similar properties.

The insert 150 includes an inlet end 162, an outlet end 164, and a flow path 168 defined by an inner surface 166 that extends between the inlet end 162 and outlet end 164. The outer surface 172 of the insert 150 and the inlet end 162 define a flange 174 therebetween.

The throat retainer 152 retains the insert 150 within the flow path 154 to prevent the insert 150 from exiting the valve nozzle 120. The throat retainer 152 includes an inlet end 176, an outlet end 178, and a passage 180 defined by an inner surface 182 that extends between the inlet end 176 and outlet end 178. The inlet end 176 is configured to receive and retain the insert 150 against the valve nozzle housing 106 and couples to the outer surface 172 of the insert 150. In the depicted embodiment, the throat retainer 152 is conical and the insert 150 is retained against the ledge 160. The passage 180 is in fluid communication with the flow path 154.

The throat retainer 152 is constructed of a material capable of operating at extreme high temperatures (up to about 5000° F.) that has ablative and insulating properties. Examples of suitable materials include, but are not limited to, phenolic, EPDM, or any similar rubber compound. The throat retainer 152 can be made of the same material as the nozzle housing 106.

To manufacture the above-described valve nozzle, a valve nozzle housing 106, an insert 150, and a throat retainer 152 are each formed from suitable materials. A flow path 154 having a desired shape is formed into the valve nozzle housing 106. Next, the insert 150 is press-fit into the valve nozzle throat section 148. Then, an adhesive 184 is applied to the outer peripheral surface of the throat retainer 152. The adhesive 184 may be any bonding agent, such as epoxy resin, or film adhesive, or any other conventional adhesive. The throat retainer 152 is then pressed into the nozzle 122 until the inlet end 176 contacts the insert 150 and the insert flange 174 is pressed against the housing ledge 160. The throat retainer 152 is held in place until it is bonded to the nozzle housing 106.

Thus, when hot gases pass through the valve nozzle throat section 148, the heat from the gases causes the insert 150 and the throat retainer 152 to expand. The expanded throat retainer 152 traps the flange 174 of the insert 150 against the ledge 160 and prevents the insert 150 from propelling out of the valve nozzle 122. Additionally, because the throat retainer 152 is constructed of an insulating material, the heat passing over the throat retainer 152 is insulated from the adhesive 184 that bonds the throat retainer 152 to the housing 106.

There has now been provided a valve nozzle capable of maintaining its shape upon exposure to extreme high temperatures. The valve nozzle is also capable of insulating components from heat for a predetermined period of time.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A nozzle for use in a hot gas valve, the nozzle comprising:
   a housing comprising an insulating material, the housing having a flow path formed therein that includes a throat section;
   a throat retainer comprising material having insulating and ablative properties, the throat retainer disposed at least partially within the housing throat section and coupled to the housing; and
   an insert comprising material capable of maintaining structural integrity at a temperature up to about 5000° F. the insert disposed at least partially within the housing throat section and having an outer surface, an inlet end, an outlet end, and a flow path extending between the inlet and outlet ends in fluid communication with the housing flow path, the outer surface and the inlet end defining a flange therebetween that is at least partially retained between the housing and the throat retainer.

2. The nozzle of claim 1, wherein:
   the housing further comprises a cylindrical section and a divergent section coupled to one another by the throat section, the cylindrical section having a cross sectional flow area; and
   the divergent section has an inlet and an outlet, the inlet having a cross section flow area greater than the cylindrical section cross sectional flow area.

3. The nozzle of claim 1, wherein the throat retainer further comprises an inlet end, an outlet end, and a passage extending therebetween, the passage in fluid communication with the housing flaw path and the inlet end configured to couple to the insert outer surface.

4. The nozzle of claim 1, further comprising an adhesive layer between the housing and the throat retainer.

5. The nozzle of claim 4, wherein the throat is configured to expand and insulate the adhesive layer from heat.

6. The nozzle of claim 1, wherein the housing material comprises phenolic.

7. The nozzle of claim 1, wherein the throat retainer material comprises phenolic.

8. The nozzle of claim 1, wherein the housing material and throat retainer material comprise the same material.

9. The nozzle of claim 1, wherein the housing material and throat retainer material comprise different material.

10. The nozzle of claim 1, wherein the insert material comprises at least one of a refractory material, and alloys including more than one refractory, ceramic or ceramic/metallic hybrid material.

11. The nozzle of claim 10, wherein the refractory material comprises at least one of tungsten, rhenium, molybdenum, niobium, tantalum, and titanium.

12. The nozzle of claim 1, wherein the insert material comprises ceramic.

* * * * *

UNITED STATES PATENT AND TRADEMARK OFFICE
CERTIFICATE OF CORRECTION

| | | |
|---|---|---|
| PATENT NO. | : 7,269,951 B2 | Page 1 of 1 |
| APPLICATION NO. | : 10/952109 | |
| DATED | : September 18, 2007 | |
| INVENTOR(S) | : Jason A. Gratton et al. | |

It is certified that error appears in the above-identified patent and that said Letters Patent is hereby corrected as shown below:

Column 6, line 26, "flaw" should be changed to --flow--.

Signed and Sealed this

Twenty-seventh Day of November, 2007

JON W. DUDAS
*Director of the United States Patent and Trademark Office*